United States Patent
Kim

(10) Patent No.: US 8,239,214 B2
(45) Date of Patent: Aug. 7, 2012

(54) METHOD AND APPARATUS FOR BACKING UP POWER FAILURE FOR AUTOMATIC MEDICINE PACKING MACHINE

(75) Inventor: Jun Ho Kim, Taegu (KR)

(73) Assignee: JVM Co., Ltd. (KR)

( * ) Notice: Subject to any disclaimer, the term of this patent is extended or adjusted under 35 U.S.C. 154(b) by 342 days.

(21) Appl. No.: 11/627,561

(22) Filed: Jan. 26, 2007

(65) Prior Publication Data

US 2008/0114818 A1    May 15, 2008

(30) Foreign Application Priority Data

Nov. 13, 2006 (KR) ........................ 10-2006-0111790

(51) Int. Cl.
*G06Q 50/00* (2012.01)
(52) U.S. Cl. ................................. 705/2; 705/3
(58) Field of Classification Search .................. 707/204; 705/2, 3
See application file for complete search history.

(56) References Cited

U.S. PATENT DOCUMENTS

| | | |
|---|---|---|
| 169,935 A | 11/1875 | Whitman |
| 350,675 A | 10/1886 | Hathaway |
| 488,721 A | 12/1892 | Stempel |
| 121,804 A | 12/1914 | Coulson |
| 1,270,756 A | 6/1918 | Holmberg |
| 1,912,248 A | 5/1933 | Bateman et al. |
| 2,005,496 A | 6/1935 | Donovan et al. |
| 2,181,314 A | 11/1939 | Burns |
| 2,208,951 A | 7/1940 | Tamassy |
| 2,255,036 A | 9/1941 | Gedge |
| 2,449,139 A | 9/1948 | Posner |
| 2,710,712 A | 6/1955 | Friedman |
| 2,712,883 A | 7/1955 | Esposito et al. |
| 2,918,069 A | 12/1959 | Brown, Jr. et al. |
| 2,994,996 A | 8/1961 | Klar |
| 3,074,214 A | 1/1963 | Schneider et al. |
| 3,227,127 A | 1/1966 | Gayle |
| 3,263,857 A | 8/1966 | Krakauer et al. |
| 3,348,392 A | 10/1967 | Schreiber |
| 3,408,876 A | 11/1968 | Andrews |
| 3,410,452 A | 11/1968 | Igel et al. |
| 3,481,103 A | 12/1969 | Summerour |
| 3,546,849 A | 12/1970 | Zimmerman |
| 3,562,475 A | 2/1971 | Angelotti et al. |
| 3,604,559 A | 9/1971 | McCall et al. |
| 3,774,368 A | 11/1973 | Paprzycki |
| 3,820,655 A | 6/1974 | La Tourette et al. |
| 3,830,419 A | 8/1974 | Lee |
| 3,842,569 A | 10/1974 | McClelland et al. |
| 3,850,780 A | 11/1974 | Crawford et al. |
| 3,861,651 A | 1/1975 | Takamura |
| 3,871,156 A | 3/1975 | Koenig et al. |
| 3,921,419 A | 11/1975 | Rosenkranz et al. |

(Continued)

FOREIGN PATENT DOCUMENTS

GB    2178397    2/1987

(Continued)

*Primary Examiner* — Gerald J. O'Connor
*Assistant Examiner* — Neha Patel
(74) *Attorney, Agent, or Firm* — John K. Park; Park Law Firm

(57) ABSTRACT

A method for backing up power failure for an automatic medicine packing machine includes steps of creating backup file from prescription data, storing backup file, deleting backup file for which packing of corresponding medicine is completed, detecting power recovery, and performing backup operation. In the step of creating backup file, when prescription data are received, the prescription data are arranged in preparation order and classified into one or more packing units, and a backup file is created for each of the packing units. An apparatus for the method includes a controller, a storage unit that stores backup files and a power recovery detecting unit that detects power recovery after power failure.

3 Claims, 3 Drawing Sheets

U.S. PATENT DOCUMENTS

| | | |
|---|---|---|
| 3,990,209 A | 11/1976 | Eisenberg |
| 4,003,030 A * | 1/1977 | Takagi et al. ............... 705/24 |
| 4,019,547 A | 4/1977 | Ross |
| 4,149,394 A | 4/1979 | Sornes |
| 4,209,211 A | 6/1980 | Alford |
| 4,244,158 A | 1/1981 | Nelham |
| 4,254,601 A | 3/1981 | Prager et al. |
| 4,267,942 A | 5/1981 | Wick, Jr. et al. |
| 4,382,527 A | 5/1983 | Lerner |
| 4,519,179 A | 5/1985 | Meier |
| 4,534,499 A | 8/1985 | Cox et al. |
| 4,572,376 A | 2/1986 | Wrennall |
| 4,664,289 A | 5/1987 | Shimizu et al. |
| 4,696,392 A | 9/1987 | Chisholm, Jr. |
| 4,771,912 A | 9/1988 | van Wingerden |
| 4,790,118 A | 12/1988 | Chilcoate |
| 4,790,421 A | 12/1988 | Gorges |
| 4,811,764 A | 3/1989 | McLaughlin |
| 4,903,861 A | 2/1990 | Yuyama |
| 4,915,259 A | 4/1990 | Guigan et al. |
| 4,922,682 A | 5/1990 | Tait et al. |
| 4,955,178 A | 9/1990 | Shroyer |
| 5,069,511 A | 12/1991 | Swets et al. |
| 5,097,652 A | 3/1992 | Inamura et al. |
| 5,219,095 A | 6/1993 | Shimizu et al. |
| 5,221,024 A | 6/1993 | Campbell |
| 5,318,430 A | 6/1994 | Ramm |
| 5,337,919 A | 8/1994 | Spaulding et al. |
| 5,348,061 A | 9/1994 | Riley et al. |
| 5,381,904 A | 1/1995 | Thurell |
| 5,383,559 A | 1/1995 | Toren |
| 5,413,245 A | 5/1995 | Wright |
| 5,441,165 A | 8/1995 | Kemp et al. |
| 5,459,983 A | 10/1995 | Sadek et al. |
| 5,481,855 A | 1/1996 | Yuyama |
| 5,487,289 A | 1/1996 | Otto, III et al. |
| 5,502,944 A | 4/1996 | Kraft et al. |
| 5,509,573 A | 4/1996 | Campoli |
| 5,522,525 A | 6/1996 | McLaughlin et al. |
| 5,575,465 A | 11/1996 | Auerbach et al. |
| 5,588,792 A | 12/1996 | Tiso |
| 5,599,015 A | 2/1997 | Shimizu et al. |
| 5,611,456 A | 3/1997 | Kasper |
| 5,626,219 A | 5/1997 | Deefholts et al. |
| 5,651,476 A | 7/1997 | Percy et al. |
| 5,660,305 A | 8/1997 | Lasher et al. |
| 5,667,096 A | 9/1997 | Wu |
| 5,671,592 A | 9/1997 | Yuyama et al. |
| 5,678,393 A | 10/1997 | Yuyama et al. |
| 5,709,063 A | 1/1998 | Yuyama et al. |
| 5,722,215 A | 3/1998 | Yuyama |
| 5,749,117 A | 5/1998 | Forsline |
| 5,765,606 A | 6/1998 | Takemasa et al. |
| 5,787,678 A | 8/1998 | Koike et al. |
| 5,797,248 A | 8/1998 | Hetherington et al. |
| 5,803,309 A | 9/1998 | Yuyama et al. |
| 5,819,500 A | 10/1998 | Haraguchi et al. |
| 5,839,257 A | 11/1998 | Soderstrom et al. |
| 5,850,508 A * | 12/1998 | Lee et al. ............... 714/20 |
| 5,852,911 A | 12/1998 | Yuyama et al. |
| 5,865,342 A | 2/1999 | Ito et al. |
| 5,875,610 A | 3/1999 | Yuyama et al. |
| 5,901,876 A | 5/1999 | Yuyama et al. |
| 5,927,546 A | 7/1999 | Yuyama et al. |
| 5,930,145 A | 7/1999 | Yuyama et al. |
| 5,944,057 A | 8/1999 | Pierce |
| 5,946,883 A | 9/1999 | Yuyama et al. |
| 5,963,453 A | 10/1999 | East |
| 5,964,374 A | 10/1999 | Yuyama et al. |
| 5,987,859 A | 11/1999 | Dreger |
| 6,012,602 A | 1/2000 | Yuyama et al. |
| 6,023,916 A | 2/2000 | Bouthiette |
| 6,029,683 A | 2/2000 | Moebs et al. |
| 6,050,064 A | 4/2000 | Yuyama et al. |
| 6,089,136 A | 7/2000 | Hinojosa et al. |
| 6,109,486 A | 8/2000 | Lee, Jr. et al. |
| 6,119,440 A | 9/2000 | Benner, Jr. et al. |
| 6,119,892 A | 9/2000 | Laurent et al. |
| 6,145,700 A | 11/2000 | Takahashi et al. |
| 6,164,038 A | 12/2000 | Kim |
| 6,170,229 B1 | 1/2001 | Kim |
| 6,170,230 B1 | 1/2001 | Chudy et al. |
| 6,170,699 B1 | 1/2001 | Kim |
| 6,179,205 B1 | 1/2001 | Sloan |
| 6,202,385 B1 | 3/2001 | Kim |
| 6,216,418 B1 | 4/2001 | Kim |
| 6,256,963 B1 | 7/2001 | Kim |
| 6,263,639 B1 | 7/2001 | Kim |
| 6,273,335 B1 | 8/2001 | Sloan |
| 6,308,494 B1 | 10/2001 | Yuyama et al. |
| 6,311,743 B1 | 11/2001 | Baroncini |
| 6,318,051 B1 | 11/2001 | Preiss |
| 6,349,848 B1 | 2/2002 | Uema et al. |
| 6,364,517 B1 | 4/2002 | Yuyama et al. |
| 6,367,232 B2 | 4/2002 | Kim |
| 6,394,308 B1 | 5/2002 | Yuyama et al. |
| 6,409,290 B1 | 6/2002 | Lin |
| 6,427,865 B1 | 8/2002 | Stillwell et al. |
| 6,449,921 B1 | 9/2002 | Kim |
| 6,457,611 B1 | 10/2002 | Koehler |
| 6,471,089 B2 | 10/2002 | Liff et al. |
| 6,471,090 B1 | 10/2002 | Inamura et al. |
| 6,478,185 B2 | 11/2002 | Kodama et al. |
| 6,481,180 B1 | 11/2002 | Takahashi et al. |
| 6,508,279 B2 | 1/2003 | Siegel et al. |
| 6,540,101 B1 | 4/2003 | Kim |
| 6,580,968 B1 * | 6/2003 | Yuyama et al. ............... 700/241 |
| 6,581,356 B2 | 6/2003 | Kim |
| 6,585,132 B2 | 7/2003 | Kim |
| 6,604,019 B2 | 8/2003 | Ahlin et al. |
| 6,611,733 B1 | 8/2003 | De La Huerga |
| 6,644,504 B2 | 11/2003 | Yuyama et al. |
| 6,647,702 B1 | 11/2003 | Kim |
| 6,722,167 B1 | 4/2004 | Hsu |
| 6,772,907 B2 | 8/2004 | Kim |
| 6,786,356 B2 | 9/2004 | Geiger et al. |
| 6,792,736 B1 | 9/2004 | Takahashi |
| 6,805,259 B2 | 10/2004 | Stevens et al. |
| 6,898,919 B2 | 5/2005 | Kim |
| 7,028,447 B2 | 4/2006 | Sung |
| 7,039,830 B2 * | 5/2006 | Qin ............... 714/13 |
| 7,059,098 B2 | 6/2006 | Kim |
| 7,331,151 B2 | 2/2008 | Kim |
| 2002/0053183 A1 * | 5/2002 | Yuyama et al. ............... 53/131.2 |
| 2002/0092275 A1 | 7/2002 | Kim |
| 2003/0057225 A1 | 3/2003 | Kim |
| 2003/0074868 A1 | 4/2003 | Yasuoka et al. |
| 2004/0046020 A1 | 3/2004 | Andreasson et al. |
| 2004/0129716 A1 | 7/2004 | Naufel et al. |
| 2004/0139128 A1 * | 7/2004 | Becker et al. ............... 707/204 |
| 2004/0182044 A1 | 9/2004 | Kim |
| 2005/0021566 A1 * | 1/2005 | Mu ............... 707/200 |
| 2005/0179349 A1 | 8/2005 | Booth et al. |
| 2005/0201731 A1 * | 9/2005 | Park et al. ............... 386/95 |
| 2005/0234430 A1 | 10/2005 | Mao et al. |
| 2006/0058918 A1 | 3/2006 | Handfield et al. |
| 2006/0070352 A1 | 4/2006 | Momich |
| 2006/0139148 A1 | 6/2006 | Faro et al. |
| 2006/0143240 A1 * | 6/2006 | Sun et al. ............... 707/202 |
| 2006/0267727 A1 | 11/2006 | Cayne et al. |
| 2006/0273106 A1 | 12/2006 | Kim |
| 2007/0016327 A1 | 1/2007 | Yuyama et al. |
| 2007/0078562 A1 | 4/2007 | Park |
| 2007/0125100 A1 | 6/2007 | Shoenfeld |
| 2007/0151204 A1 | 7/2007 | Kim |
| 2007/0208595 A1 | 9/2007 | Ohmura et al. |
| 2007/0257773 A1 | 11/2007 | Hill et al. |

FOREIGN PATENT DOCUMENTS

| | | |
|---|---|---|
| JP | 9-175510 | 7/1997 |
| JP | 9-266940 | 10/1997 |
| WO | WO 2006/036255 A1 * | 4/2006 |

* cited by examiner

FIG. 3 [PRIOR ART]
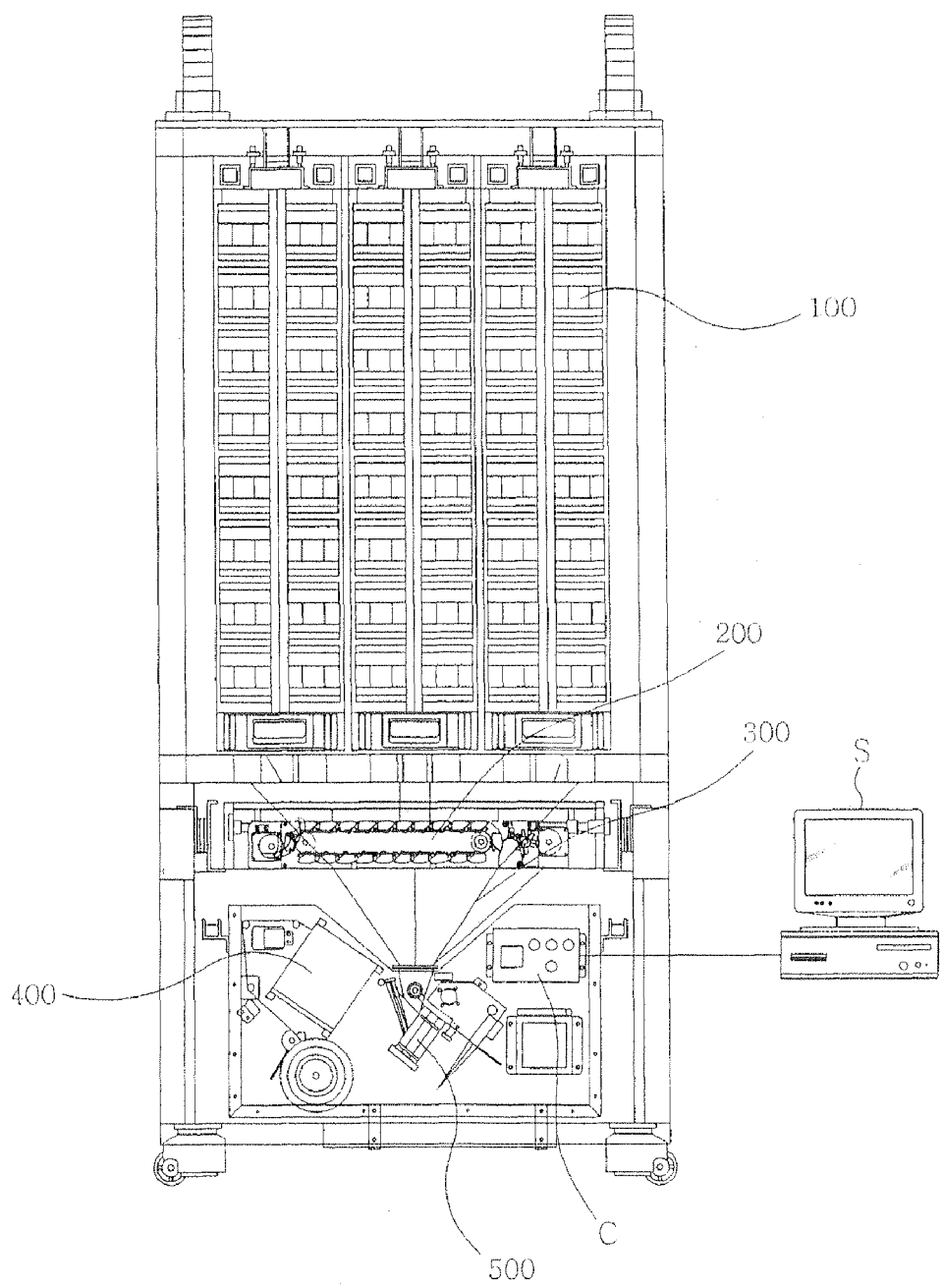

METHOD AND APPARATUS FOR BACKING UP POWER FAILURE FOR AUTOMATIC MEDICINE PACKING MACHINE

CLAIMING FOREIGN PRIORITY

The applicant claims and requests a foreign priority, through the Paris Convention for the Protection of Industrial Property, based on patent applications filed in the Republic of Korea (South Korea) with the filing date of Nov. 13, 2006 with the patent application number 10-2006-0111790 by the applicant, the contents of which are incorporated by reference into this disclosure as if fully set forth herein.

BACKGROUND OF THE INVENTION

The present invention relates to an automatic medicine packing machine. More particularly, the present invention relates to method and apparatus for backing up power failure for automatic medicine packing machine that prevent erroneous packing of medicine after power failure is recovered.

Generally, an automatic medicine packing machine continuously packs medicine that is dispensed per dose. Construction and operation of an automatic medicine packing machine are explained referring to FIG. 3. The automatic medicine packing machine includes a plurality of tablet cassettes 100 that are received on a shelf in the upper part of the machine, a tablet dispenser 200, a hopper 300 that is provided below the tablet cassettes 100 and the tablet dispenser 200, a printing unit 400, and a sealing unit 500 that moves and seals packing envelopes on which labels are printed by the printing unit 400.

The operation of the printing unit 400 is controlled by a controller C that is provided inside the machine. The controller C controls the printing unit 400 to print label on the outer surface of the packing envelope according to printing information provided by a server S that is provided outside the machine.

The disadvantages of the prior art are that when the power fails during packing operation for medicine, the prescription data stored in the controller is lost and the entire medicine that were prescribed in the data should be prepared again; medicine packed before power failure and after power recovery are mixed and makes precise packing difficult; and such duplicate packing delays the packing and needs extra man power and machine operation time.

SUMMARY OF THE INVENTION

The present invention contrives to solve the disadvantages of the prior art.

An objective of the invention is to provide method and apparatus for backing up power failure that prevents duplicate packing of medicine, facilitates stable and precise packing, and prevents delay due to duplicate packing.

Another objective of the invention is to provide method and apparatus for backing up power failure that facilitates storing prescription data with simple structure and a backup file, and facilitates search and loading of the backup file after power recovery.

In order to achieve the above objective, the present invention provides a method for backing up power failure for an automatic medicine packing machine. The method includes steps of creating backup file, wherein a backup file is created from a prescription data, storing backup file, wherein the backup file created in the step of creating backup file is stored, deleting backup file, wherein the backup file, for which packing of corresponding medicine is completed according to the prescription data, is deleted, detecting power recovery, wherein power recovery after power failure is detected; and performing backup operation, wherein backup operation of the automatic medicine packing machine is performed when power recovery is detected.

In the step of creating backup file, when prescription data are received, the prescription data are arranged in preparation order and classified into one or more packing units, and a backup file is created for each of the packing units. The packing unit comprises a unit that is classified for each patient.

In the step of storing backup file, the backup file is stored in a storage unit that is separately provided.

In the step of performing backup operation, medicine packing is performed according to the backup file(s) stored in the storage unit.

In the step of performing backup operation, whether there is a backup file in the storage unit is searched. If there is no backup file in the storage unit, new prescription data are input from a server computer. If there are one or more backup files found by the search, a situation, in which packing is performed in continuation to a packing just before the power failure, is displayed on a server computer.

The present invention also provides an apparatus for backing up power failure for an automatic medicine packing machine having a plurality of tablet cassettes that contain medicine, a printing unit that prints data on packing envelopes that contain medicine and a sealing unit that seals the packing envelopes. The apparatus includes a controller for the automatic medicine packing machine, which controls the tablet cassettes, the printing unit and the sealing unit of the automatic medicine packing machine according to prescription data that are input from a server computer, a storage unit that is connected to the controller and stores backup files that are input into the controller and a power recovery detecting unit that detects power recovery after power failure in the automatic medicine packing machine.

The controller creates backup files with the prescription data that are input from the server computer, stores them in the storage unit, and loads the backup files and performs packing operation according to the backup files stored in the storage unit when power recovery is reported from the power recovery detecting unit.

The power recovery detecting unit detects voltage applied to the controller.

The controller comprises a backup file creation module that arranges the prescription data input from the server computer in preparation order, classifies the prescription data for each packing unit, creates a backup file for each classified packing unit, and stores the created backup files in the storage unit, and a backup file deletion module that deletes the backup file, for which corresponding medicine has already been packed, for each packing unit.

The controller further comprises a backup file search module that searches whether a backup file exists in the storage unit after power recovery is reported from the power recovery detecting unit. If a backup file is not found, a new prescription data is requested to the server computer, and if one or more backup files are found, the searched backup files are loaded promptly to the controller.

The controller further includes a continued packing display module that displays continued packing status on the server computer when a backup file is found by searching with the backup file search module.

The storage unit comprises a hard disk drive.

The advantages of the present invention are: (1) duplicate medicine packing due to power failure and recovery is prevented in advance; (2) stable and precise packing is continued after power recovery; (3) delay due to duplicate packing is prevented; (4) the apparatus has a simple structure facilitating its installation and setting; (5) storing prescription data is conveniently performed with backup files; and (6) deleting backup files for which packing have been completed makes searching and loading of backup files easy and precise.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 3 is an elevation view of an automatic medicine packing machine.

DETAILED DESCRIPTION OF THE INVENTION

Figure 1:
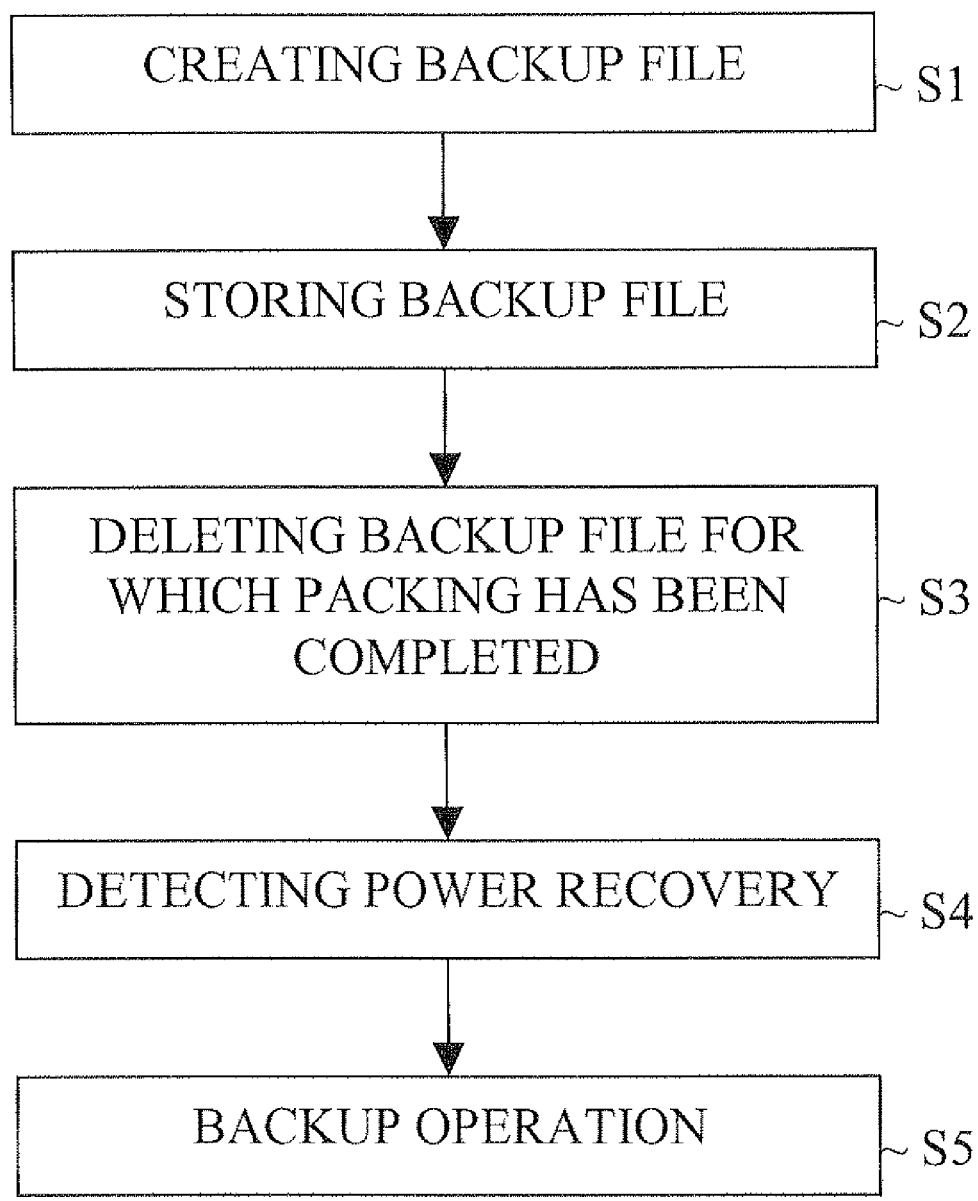
FIG. 1 is a flow diagram of a method for backing up power failure for an automatic medicine packing machine according to the present invention.

FIG. 1 shows a method for backing up power failure for an automatic medicine packing machine. The method includes step S1 of creating backup file, in which a backup file is created from a prescription data, step S2 of storing backup file, in which the backup file created in step S1 is stored, step S3 of deleting backup file, in which the backup file for which packing of corresponding medicine is completed is deleted, step S4 of detecting power recovery, in which power recovery after power failure is detected, and step S5 of performing backup operation, in which backup operation of the automatic medicine packing machine is performed when power recovery is detected. These steps are performed sequentially and enable stable operation of medicine packing when the power is restored.

In step S1, when prescription data are input with a server computer to a controller, the controller arranges the prescription data in preparation order, classifies the data with each packing unit, and creates a backup file for each packing unit. Preferably the packing unit is a unit classified for each patient. In other words, the prescription data are classified for each patient, and the backup file is created for each patient.

In step S2, the backup file created in step S1 is stored in a separate storage unit that is electrically connected to the controller. In this way, even if prescription data that is input in the controller is lost by power failure, the controller can use the backup file stored in the storage unit.

In step S3, the controller deletes the backup file for the medicine that has already been packed during the operation of the automatic medicine packing machine. Among a plurality of backup files, the backup file, for which packing has been completed, is deleted so that the controller retrieves remaining backup files when a power failure and a subsequent power recovery occur and operate the packing machine according to the remaining backup files. In this way, seamless operation of medicine packing that is continuous from the operation before power failure.

In step S4, a power recovery detecting unit detects power recovery, when a power failure occurs during operation of the automatic medicine packing machine and then power is recovered. The moment of power recovery is detected and reported to the controller so that the controller recognizes the timing of using the backup files.

In step S5, operation of packing medicine according to the backup files stored in the storage unit is performed when power recovery is reported in step S4. When the controller searches backup files in the storage unit, if there is no backup file in the storage unit, new prescription data are input from the server computer. In this way, prompt operation of the packing machine is facilitated. If there are one or more backup files found by the search, the situation is displayed on the server computer so that a user can easily recognize that the automatic medicine packing machine is packing medicine following the packing operation just before the power failure.

Figure 2:
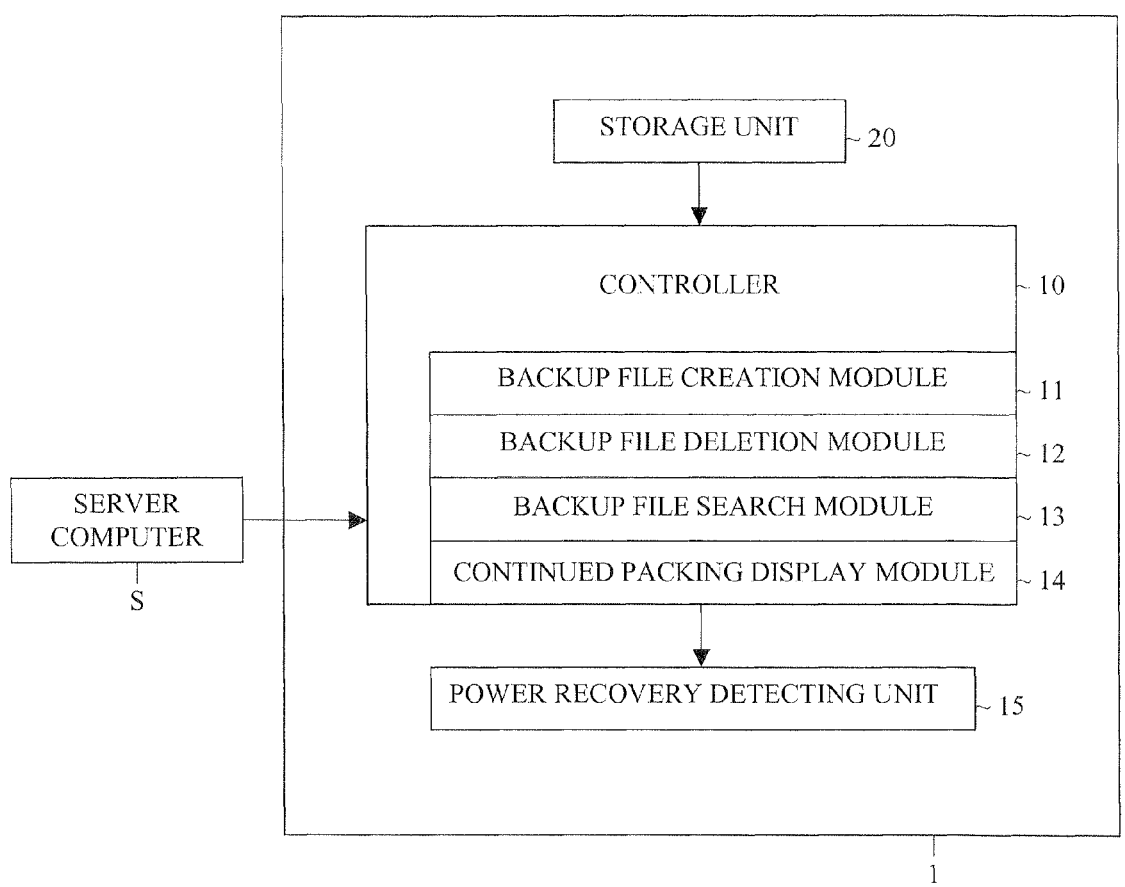
FIG. 2 is a block diagram of an apparatus for backing up power failure for an automatic medicine packing machine according to the present invention.

Referring FIG. 2, an apparatus for backing up power failure for an automatic medicine packing machine includes a controller 10 of an automatic medicine packing machine 1, which controls tablet cassettes, a printing unit and a sealing unit of the automatic medicine packing machine 1 according to prescription data that are input by a server computer S; a storage unit 20 that stores backup files that are input by the controller 10; and a power recovery detecting unit 15 that detects power recovery after power failure in the automatic medicine packing machine 1.

The controller 10 creates backup files with the prescription data that are input from the server computer, stores them in the storage unit 20, and loads the backup files and performs packing operation according to the backup files stored in the storage unit 20 when power recovery is reported from the power recovery detecting unit 15.

The controller 10 further includes a backup file creation module 11 that arranges the prescription data input by the server computer in preparation order, classifies the prescription data for each packing unit, creates a backup file for each classified packing unit, and stores the created backup files in the storage unit 20.

The controller 10 further includes a backup file deletion module 12 that deletes a backup file, for which corresponding medicine has already been packed, for each packing unit.

The controller 10 further includes a backup file search module 13 that searches whether a backup file exists in the storage unit 20 after power recovery is reported from the power recovery detecting unit 15. If a backup file is not found, a new prescription data is requested to the server computer. If one or more backup files are found, the searched backup files are loaded promptly to the controller 10.

The controller 10 further includes a continued packing display module 14 that displays continued packing status on a monitor for the server computer when a backup file is found by searching with the backup file search module 13. In this way, the user can recognize that the packing is continuous before and after a power failure, an erroneous duplicate input of prescription data is prevented.

The storage unit 20 may utilize various storage devices including a hard disk drive, which can store mass data stably and easily and allows easy loading and deletion of files.

The power recovery detecting unit 15 has a role of informing the controller 10 that power is recovered in the automatic medicine packing machine 1 after power failure, and is preferably implemented as a constant voltage circuit that senses voltage that are supplied to the controller 10.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An apparatus for backing up prescription data in an automatic medicine packing machine before a power failure in order to prevent the erroneous packing of medicine after a power failure, wherein the medicine packing machine comprises a plurality of tablet cassettes that contain medicine, a printing unit that prints data on packing envelopes that contain medicine and a sealing unit that seals the packing envelopes, the apparatus comprising:
   a) a controller for the automatic medicine packing machine, which controls the tablet cassettes, the printing unit and the sealing unit of the automatic medicine packing machine according to prescription data that are input from a server computer;
   b) a storage unit that is connected to the controller and stores backup files that are input into the controller; and
   c) a power recovery detecting unit that detects power recovery after power failure in the automatic medicine packing machine;
   wherein the controller creates backup files with the prescription data that are input from the server computer, stores them in the storage unit, and loads the backup files and performs packing operation according to the backup files stored in the storage unit when power recovery is reported from the power recovery detecting unit; and
   wherein the controller comprises a backup file creation module that arranges the prescription data input from the server computer in preparation order, classifies the prescription data for each packing machine, creates a backup file for each classified packing machine, and stores the created backup files in the storage unit, and a backup file deletion module that deletes the backup file, for which corresponding medicine has already been packed, for each packing machine;
   wherein the controller further comprises a backup file search module that searches whether a backup file exists in the storage unit after power recovery is reported from the power recovery detecting unit;
   wherein if a backup file is not found, a new prescription data is requested to the server computer, wherein if one or more backup files are found, the searched backup files are loaded promptly to the controller;
   wherein the controller further includes a continued packing display module that displays continued packing status on the server computer when a backup file is found by searching with the backup file search module.

2. The apparatus of claim 1, wherein the power recovery detecting unit detects voltage applied to the controller.

3. The apparatus of claim 1, wherein the storage unit comprises a hard disk drive.

* * * * *